Feb. 16, 1932.　　　C. F. HUFFMAN　　　1,845,276
MULTIPLE ROW CORN PICKING MACHINE
Filed Jan. 7, 1929
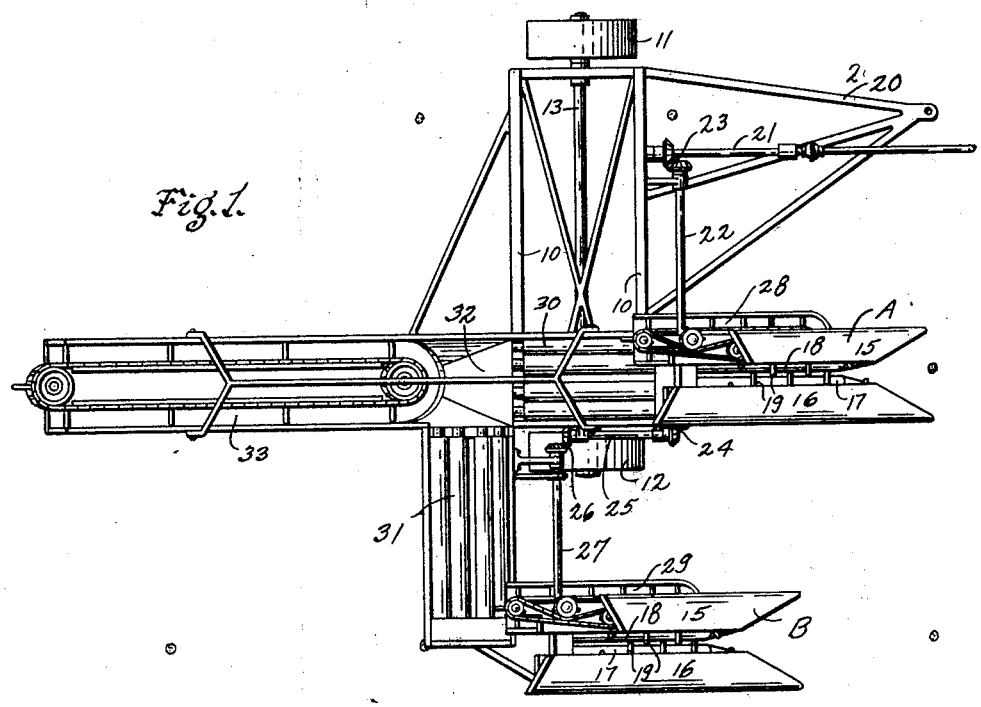
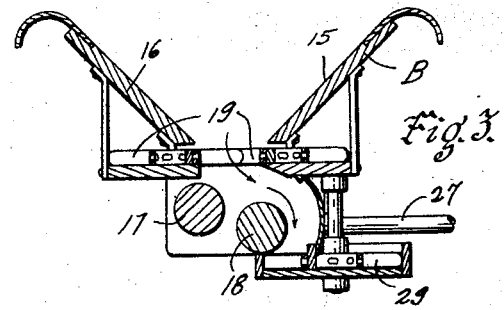
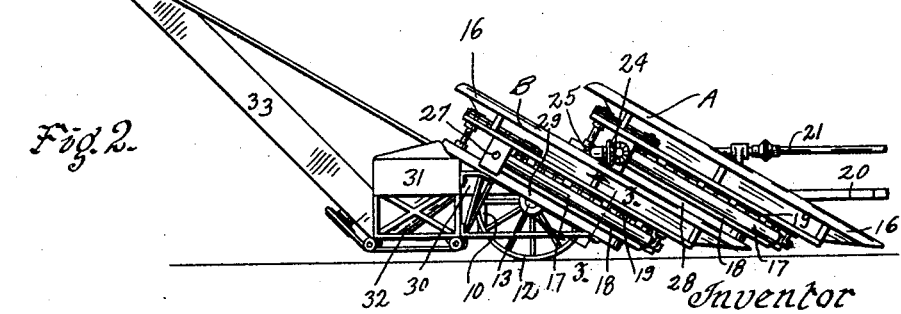
Inventor
Charles F. Huffman
by Bair, Freeman & Sinclair
Attorneys
Witness Patented Feb. 16, 1932

1,845,276

UNITED STATES PATENT OFFICE

CHARLES F. HUFFMAN, OF WEBSTER CITY, IOWA

MULTIPLE-ROW CORN PICKING MACHINE

Application filed January 7, 1929. Serial No. 330,947.

The object of this invention is to provide an improved construction for a corn picking machine having a plurality of picking units, such units being arranged in a peculiar relation to each other to facilitate the operation of the machine by preventing clogging or other interference with its advance through a field.

A further object of the invention is to provide an improved multiple-row corn picking machine in which one unit is arranged for travel in advance of another in such manner that the units do not operate on directly opposed corn hills and thereby interference with successful operation, due to entangled stalks, is successfully obviated.

With these and other objects in view my invention consists in the construction, arrangement and combination of the various parts of my device, whereby the objects contemplated are attained, as hereinafter more fully set forth, pointed out in my claim, and illustrated in the accompanying drawings, in which:

Figure 1 is a plan view of a two-row corn picker embodying my improvement.

Figure 2 is a side elevation of the same.

Figure 3 is a cross section on the line 3—3 of Figure 2.

In the construction of multiple-row corn picking machines it has been customary to employ a plurality, usually two, of picking units arranged in transverse alignment to each other so that they operate simultaneously on hills of corn stalks arranged in the same line transversely or at right angles to the path of advance of the machine.

In the operation of such machines, difficulty has been encountered from time to time, particularly in fields where the corn is in more or less down condition, such difficulty being due to the fact that stalks of opposite hills become crossed and entangled and when they are engaged by the picking devices an undue strain is imposed, which often results in clogging of the machine.

Under such conditions, it is often necessary for the picking devices to break off or pull out the stalks so entangled and thus, a double strain is imposed which often results in stopping the machine. That is to say, in order for the machine to be able to pass by the entangled talks it is necessary to break off or pull out the stalks of two or more hills at a time; or the machine is clogged by an accumulation of broken stalks between the two units.

Furthermore, in the use of a machine involving two or more transversely aligned picking units, there is a tendency for trash, weeds, vines, sun-flower stalks and the like to pile up between the units and clog the machine so that it is prevented from proper operation or even caused to cease traveling. Indeed, where the ground of a field is very loose and broken, an accumulation of earth between the units will often be sufficient to prevent satisfactory operation.

My present invention contemplates an arrangement of two or more picking units in staggered relation, whereby the difficulties and obstacles above enumerated are overcome and the operation of the multiple unit picker is facilitated and made successful.

In the accompanying drawings, I have illustrated more or less conventionally, a corn picking machine having a frame 10 supported by wheels 11 and 12 on an axle 13 and carrying a pair of picking units of common form, which I have designated as A and B.

Each of the picking units A and B includes among other things, a pair of divider boards 15 and 16 having between them, a pair of snapping rolls 17 and 18 and gathering chains 19 arranged for engaging stalks of corn and guiding them to the snapping rolls.

The essence of this invention consists in placing one of the picking units such as A materially in advance of another unit such as B. In other words, the picking units are not placed directly side by side or in transverse alignment, but are set in staggered relation, both transversely and longitudinally of the machine.

The unit which is nearest to the draft or hitching means 20 of the machine preferably is in advance of the other unit or units and it is to be understood that in case more than two units are employed, they will all be arranged in a similar relation to what is here shown, namely with each unit set to one side and rearwardly of the next unit adjacent thereto toward the draft line.

Because of the arrangement of picking units as here shown and described, it is obvious that adjacent units will not engage and operate upon stalks or hills of corn, which are directly opposite to each other in a line at right angles to the path of advance of the machine. In other words, the foremost unit will engage stalks or hills of corn in its row materially and substantially in advance of the engagement of the adjacent unit relative to stalks or hills of corn in its row.

As shown in Figure 1, there are no frame parts or other members between the picking units, and the space between them is clear and unobstructed back as far as the line of the supporting wheels of the machine.

This arrangement prevents clogging and undue interference with the successful operation of the machine under conditions which are hereinbefore described.

It is obvious that because of the staggered or stepped relation of the picking units the foremost unit encounters its corn stalks first and operates upon them and gets them out of the way before the adjacent unit begins its work on the stalks or hills directly opposite.

Inasmuch as stalks of corn ordinarily are entangled or crossed only with those which are directly or nearly opposite to them, it is obvious that by this arrangement of units, adjacent picking units will not be caused to engage simultaneously with entangled, crossed and entwined stalks.

In other words, the units will not be compelled to pull or strain simultaneously on both of two entangled corn hills and any strain which is imposed because of entanglements will be distributed and spaced with respect to the two units.

This prevents clogging of the machine and permits its steady advance over a field even in cases where the corn is in badly down or in entangled condition.

Furthermore, in view of the inclined or diagonal arrangement of the forward ends of the picking units, and because the space between the units is open and clear, there will be no tendency to accumulate loose earth, trash, weeds or vines between the units.

Another advantage which results from this relation of parts is a saving of time and labor and a saving of corn, inasmuch as there is no interference of adjacent picking units, which would break the stalks and knock ears of corn from their stalks.

The frame 10 also carries the usual driving shaft 21 and the snapping rolls 17 of the respective picking units may be operated from this shaft in any desired manner. In the accompanying drawings, I have shown a counter shaft 22 arranged at right angles to the shaft 21 and operatively connected therewith by bevel gearing 23. The counter shaft 20 extends across the rear end of the picking unit A and is adapted to drive the snapping rolls 17 and 18 thereof.

At its outer end the shaft 22 is connected by bevel gearing 24 with a longitudinally arranged shaft 25 journaled on the frame. The shaft 25 is connected by bevel gearing 26 with a second counter shaft 27 which extends across the rear end of the picking unit B and is adapted to drive the snapping rolls 17 and 18 thereof. It is to be understood, however, that any suitable driving connections for the snapping rolls may be employed without departing from my invention.

Arranged at one side of the unit A is a conveyor 28 and at one side of the unit B a conveyor 29. The conveyor 28 carries snapped ears directly from the snapping rolls of the unit A to a husking bed 30 on the frame behind the unit A, and the conveyor 29 carries snapped ears directly from the snapping rolls of the unit B to a husking bed 31 on the frame behind the unit B.

From the husking beds 30 and 31 the husked ears are discharged to a boot 32, from which they are taken by an elevator 33 and transferred to a wagon or other suitable conveyance or receptacle in a common manner.

I claim as my invention:

A corn picking machine having a plurality of picking units, said units being arranged progressively one in advance of the next adjacent unit, from the center line of the machine outwardly, all connecting members between each pair of adjacent units being located rearwardly of the rearmost unit of the pair, to prevent the accumulation of trash and the like between the units and to reduce strain on the units by causing them to engage at different times with transversely opposed stalks which may have become crossed or entangled.

Des Moines, Iowa, December 15, 1928.

CHARLES F. HUFFMAN.